A. B. PURDOM.
SWEET POTATO VINE CUTTER.
APPLICATION FILED NOV. 18, 1920.
1,426,906. Patented Aug. 22, 1922.
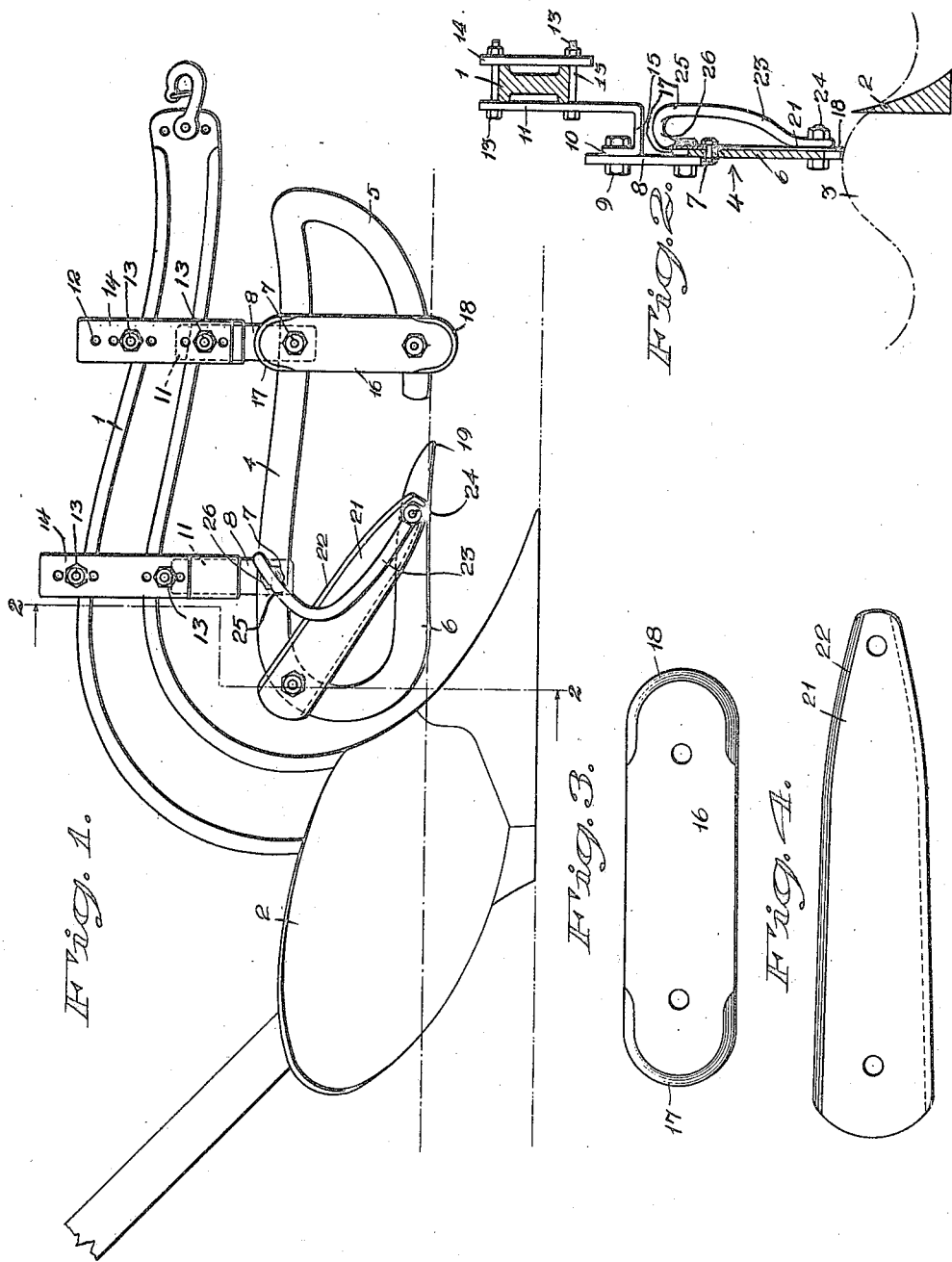
WITNESSES
E. A. Wilson
Robert J. Hulsizer
INVENTOR
ARCHIBALD B. PURDOM
BY Munn & Co
ATTORNEYS

UNITED STATES PATENT OFFICE.

ARCHIBALD BRANTLEY PURDOM, OF BLACKSHEAR, GEORGIA.

SWEET-POTATO-VINE CUTTER.

1,426,906. Specification of Letters Patent. Patented Aug. 22, 1922.

Application filed November 18, 1920. Serial No. 424,919.

*To all whom it may concern:*

Be it known that I, ARCHIBALD B. PURDOM, a citizen of the United States, and a resident of Blackshear, in the county of Pierce and State of Georgia, have invented a new and Improved Sweet-Potato-Vine Cutter, of which the following is a full, clear, and exact description.

This invention relates to cutting attachments for plows, and has particular reference to an attachment adapted to cut potato vines.

An object of the invention resides in the provision of means to readily and simply attach to any type of plow whereby vines disposed over the ground in advance of the plowshare can be cut to enhance the travel of the plowshare through the ground.

A further object of the invention resides in the provision of a simple and efficient vine-cutting attachment for plows which can be readily adjusted in a variety of positions to meet the various requirements as desired.

A further object resides in the provision of means whereby the weeds and vines are prevented from choking and clogging up the knives or cutters.

A still further object resides in the provision of a cutter-supporting frame on which the disposition of the cutters or knives can be varied at will to meet the particular requirement.

Another object resides in the provision of a potato vine cutting attachment to plows which will efficiently cut the vines without injuring the potatoes.

A further object resides in the particular construction and arrangement of parts hereinafter described and claimed and shown in the accompanying drawings.

The invention is illustrated in the drawings, of which—

Figure 1 represents a side view of a plow with the vine-cutting attachment mounted thereon;

Figure 2 is a transverse section taken on the line 2—2 of Figure 1;

Figure 3 is an elevation of the forward cutting blade; and

Figure 4 is an elevation of the rear cutting blade.

My invention comprises a vine-cutting attachment for plows, which can be attached to any suitable plow, such as the one shown in Figure 1, which has a plow beam 1 extending forwardly from the ground in front of the plowshare 2. The plow in this particular instance is shown as adapted for use in connection with digging sweet potatoes, and is a plow which is used to "bar off" the rows. Consequently, the plowshare does not travel down the center of the furrow, marked 3, but merely cuts away the side portion of the furrow, as indicated in Figure 2. At the same time the rows are being barred off, it is desirable to have some attachment to the plow which will travel along the center and top of the rows to cut the vines in two so that the vines can be turned over with the soil and disposed thereafter between the rows. After this is done, another plow travels down the center of the rows and digs up the potatoes, throwing them on both sides of the center of the row as it proceeds.

For the purpose of providing a simple, efficient and readily adjustable attachment for "barring-off" plows whereby the potato vines may be efficiently cut, I have provided a supporting frame 4, which may be of any suitable material, such as cast or wrought iron. The body portion of this frame extends parallel to the ground the required distance above the top of the rows, and has a forward, downwardly curved, rearwardly extending portion 5 and a rear, downwardly and forwardly extending portion 6. The body portion 4 is supported by means of bolts 7 from plates 8 which at their upper ends are attached by means of bolts 9 to offset portions 10 of plates 11. These plates 11 are provided with a plurality of apertures, such as 12, whereby bolts 13 extending through these apertures may be adjustably connected to similar plates 14 on the opposite side of the beam 1 to fasten the plates 11 to the beam. By passing the bolts 13 through one or another set of apertures 12, the plates 11 and the height thereof from the ground may be varied. A horizontally extending portion 15 connects the main body of plate 11 with the offset portion 10 so that the frame 4 supporting the cutters is disposed over the center of each row to one side of the plow beam. Attached to the body portion 4 and to the depending portion 5 of the frame is a knife 16 or cutter which is disposed substantially vertically with respect to the frame 4 and is made of any suitable material, such as tool steel, and has upper and lower cutting edges 17 and 18.

The cutting edge 18 on the lower end of the knife or cutter 16 is disposed to extend normally a slight amount into the ground, so as to be sure to engage and cut off vines which lie over the rows. The front edge of the depending portion 5 is curved down gradually to the knife edge 18 and acts to guide the vine into engagement with the cutting edge 18. The front edge of the frame, by thus guiding the vines beneath it also tends to hold the vines down on the soil so that the knife edge 18 can most effectively cut the vines by reason of their being held firmly in position. The combination therefore of the front guiding portion of the frame with the cutting edge provides means for gathering or guiding the vines into a position where they are most effectively held and then cut.

The rear edge of portion 5 and the front edge of portion 6 are spaced apart, and the edge 19 of portion 6 is adapted to extend very slightly beneath the surface of the soil on the top of the row, and any vines which are not properly cut by the front knife 16 are caught by this point 19 and carried up on its sloping surface 20 into engagement with a knife blade 21 which is arranged sloping rearwardly at an angle to the top of the row and is provided on each of its longitudinal edges with a cutting edge 22. The inclination of this plate is such that the vines tend to be carried up on the edge 22. This action is somewhat similar to a wedging or cam action and effectively results in a cutting of the vines. The frame 4 may be provided with apertures similar to apertures 12 above mentioned, so that the position of the blades on the frame can be varied to meet different requirements of service. It is, of course, understood that other cutting devices besides knife blades can be used, such as cutting disks.

In order to insure that the vines and weeds shall not choke the knives, especially in the upper portion of blade 21 where it joins the support 4, I have provided a curved, cast-iron guard in the form of a bar 23 pivoted at 24 to the lower end of the blade 21 and the support 6 and which extends upwardly along its major portion and then is curved inwardly, as shown at 25 in the figures, to be connected at 26 to the bolts 9 which fasten the support 4 to the plate 8. By reason of the curvature of this guard and the position of it with respect to the blade 21, the lower and major portion of the blade is adapted to cut the vines but instead of permitting the vines to travel further up on the blade the guard 23 will force the vines away from the upper portion of the blade to prevent the above-mentioned objectionable clogging action.

By providing the knives or cutters 16 and 21 with double cutting surfaces, I can reverse the blades as one edge becomes dull, so as to prolong the period of service of each blade. It is apparent that various minor modifications can be made in this apparatus without departing from the spirit of the invention.

What I claim is:

1. A cutting attachment for plows, comprising a frame, a plurality of cutters disposed on said frame, one of said cutters being disposed on a forward portion of said frame, the forward face of said frame having a sloping curvature to guide the material to be cut to the edge of the cutter blade.

2. A cutting attachment for plows, comprising a frame, means for supporting the frame in an offset position from the plow beam, front and rear depending portions on said frame having adjacent ends spaced apart, the lower edges of the depending portions adapted to extend substantially level with the top of the soil, a cutter disposed on the front depending portion having a cutting edge extending downwardly a short distance therefrom, and a second cutter disposed on the rear depending portion and having a cutting edge inclined upwardly and rearwardly with respect to the depending portion.

3. A cutting attachment for plows, comprising a frame, a plurality of cutters disposed on said frame, and a guard for one of the cutters to prevent clogging of the cutter by the weeds or vines being cut.

4. A cutting attachment for plows, comprising a frame, a plurality of cutters disposed on said frame, means for supporting said frame in an offset position with respect to the plow beam, and a guard for one of said cutters disposed adjacent the union between one end of the frame and one end of the cutter to prevent the weeds or vines being cut from clogging.

5. A cutting attachment for plows, comprising a frame, a cutter disposed on said frame and having a cutting edge inclined forwardly and downwardly with respect to the frame, and a guard attached to the frame and disposed adjacent the upper rearward edge of the cutter blade to prevent vines or weeds being cut from clogging between the upper end of the cutter and the frame.

6. A cutting attachment for plows, comprising a frame, front and rear depending portions on said frame having adjacent ends spaced apart, he front dependent portion sloping downwardly and rearwardly and the rear depending portion sloping downwardly and forwardly, the adjacent ends of these depending portions being substantially on a level with the top of the soil to be treated, a cutter disposed on the front depending portion having a cutting edge which extends downwardly a short distance therefrom, and a second cutter disposed on the rear depending portion having a cutting edge inclined upwardly and rearwardly with respect to the depending portion.

7. A cutting attachment for plows, comprising a frame, front and rear depending portions on said frame having adjacent ends spaced apart, a front depending portion sloping downwardly and rearwardly and a rear depending portion sloping downwardly and forwardly, the adjacent ends of these depending portions being substantially on a level with the top of the soil to be treated, a cutter disposed on the front depending portion having a cutting edge which extends downwardly a short distance therefrom, a second cutter disposed on the rear depending portion having a cutting edge inclined upwardly and rearwardly with respect to the depending portion, and a guard attached at one end to the lower end of the cutter on the rear depending portion and at the other end to the frame, said guard intermediate its length curved upwardly and outwardly to prevent the vines or weeds from being clogged or wedged between the upper end of the cutter and the frame.

8. A cutting attachment for plows comprising a frame adapted to be supported from a plow beam, a cutter on the forward portion of said frame having a cutting edge adapted to extend slightly into the soil to cut vines, a second cutter disposed rearwardly of the first-mentioned cutter and inclined upwardly and rearwardly with respect to the travel of the plow, and means on the frame to guide the vines on to said second cutter.

ARCHIBALD BRANTLEY PURDOM.